United States Patent
Pfeil (10) Patent No.: US 11,790,218 B2
(45) Date of Patent: Oct. 17, 2023

(54) MACHINE LEARNING SYSTEM, AS WELL AS A METHOD, A COMPUTER PROGRAM, AND A DEVICE FOR CREATING THE MACHINE LEARNING SYSTEM

(71) Applicant: Robert Bosch GmbH, Stuttgart (DE)

(72) Inventor: Thomas Pfeil, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 768 days.

(21) Appl. No.: 16/860,449

(22) Filed: Apr. 28, 2020

(65) Prior Publication Data

US 2020/0356845 A1 Nov. 12, 2020

(30) Foreign Application Priority Data

May 8, 2019 (DE) .................. 102019206621.6

(51) Int. Cl.
| | |
|---|---|
| *G05D 1/00* | (2006.01) |
| *G06N 20/00* | (2019.01) |
| *G06N 3/04* | (2023.01) |
| *G06N 3/08* | (2023.01) |
| *G06T 7/00* | (2017.01) |
| *G06N 3/063* | (2023.01) |

(52) U.S. Cl.
CPC .......... *G06N 3/063* (2013.01); *G05D 1/0088* (2013.01); *G06N 20/00* (2019.01); *G06T 7/00* (2013.01)

(58) Field of Classification Search
None
See application file for complete search history.

(56) References Cited

U.S. PATENT DOCUMENTS

| | | | |
|---|---|---|---|
| 2019/0273948 A1* | 9/2019 | Yin ........................ | G06N 3/045 |
| 2022/0019829 A1* | 1/2022 | Tal ......................... | H04N 7/181 |
| 2022/0309320 A1* | 9/2022 | Trusov ................... | G06F 9/3887 |

FOREIGN PATENT DOCUMENTS

| | | |
|---|---|---|
| DE | 102017218889 A1 | 4/2019 |
| DE | 102018220608 A1 | 3/2020 |

OTHER PUBLICATIONS

Chao Yan, "Vision-based Driver Behaviour Analysis," Dissertation, University of Liverpool, Mar. 2016 (Year: 2016).*
Hubara et al., "Quantized Neural Networks: Training Neural Networks with Low Precision Weights and Activations," arXiv: 1609.07061v1 [cs.NE] Sep. 22, 2016 (Year: 2016).*
Zhu et al., "Detecting Video Events Based on Action Recognition in Complex Scenes Using Spatio-Temporal Descriptor" MM'09 Proceedings of the 17th ACM International Conference on Multimedia, Oct. 2009 (Year: 2009).*

(Continued)

*Primary Examiner* — Soo Shin
(74) *Attorney, Agent, or Firm* — NORTON ROSE FULBRIGHT US LLP; Gerard Messina (57) ABSTRACT

A machine learning system, including at least one temporal filter. An input variable, encompassing a chronological sequence of images, is processed with the aid of the machine learning system, using the filter. The machine learning system is configured to use the filter on a sequence of pixels, which are all situated at identical coordinates of the images, or at identical coordinates of intermediate results. Filter coefficients of the filter are quantized. A method, a computer program, and a device for creating the machine learning system are also described.

16 Claims, 5 Drawing Sheets

(56) References Cited

OTHER PUBLICATIONS

Feichtenhofer, et al.: "Convolutional Two-Stream Network Fusion for Video Action Recognition", In: Proceedings of the IEEE Conference on Computer Vision and Pattern Recognition, (2016), pp. 1933-1941.
Sze, et al.: "Efficient Processing of Deep Neural Networks: A Tutorial and Survey". Proceedings of the IEEE, (2017), 105(12), pp. 2295-2329.
Alom, et al.: "Effective Quantization Approaches for Recurrent Neural Networks", arxiv.org, Cornell University Library, NY (2018), pp. 1-8, XP081219765.
Ji, et al.: "3D Convolutional Neural Networks for Human Action Recognition", IEEE Transactions on Pattern Analysis and Machine Intelligence, IEEE Computer Society, USA, 35(1), (2013), pp. 221-231, XP011490774.
Köpüklü, et al.: "Resource Efficient 3D Convolutional Neural Networks", (2019), pp. 1-10, arXiv:1904.02422.v2, XP055732172.
Lee, et al.: "Fixed-Point Quantization of 3D Convolutional Neural Networks for Energy-Efficient Action Recognition", 2018 International Soc. Design Conference (ISOCC). IEEE, Nov. 12, 2018, pp. 129-130, XP033523052.
Hubara et al., "Quantized Neural Networks: Training Neural Networks With Low Precision Weights and Activations", The Journal of Machine Learning Research, 2017, vol. 18. , No. 1, pp. 1-30.

\* cited by examiner

MACHINE LEARNING SYSTEM, AS WELL AS A METHOD, A COMPUTER PROGRAM, AND A DEVICE FOR CREATING THE MACHINE LEARNING SYSTEM

CROSS REFERENCE

The present application claims the benefit under 35 U.S.C. § 119 of German Patent Application No. DE 102019206621.6 filed on May 8, 2019, which is expressly incorporated herein by reference in its entirety.

FIELD

The present invention relates to a machine learning system including quantized parameters. The present invention furthermore relates to a method and to a computer program, as well as to a device for creating the machine learning system.

BACKGROUND INFORMATION

German Patent Application No. DE 10 2017 218 889.8 describes an artificial intelligence module which is designed to process one or multiple input variable(s) into one or multiple output variable(s) using an internal processing chain. The internal processing chain is established by one or multiple parameter(s). A distribution model is provided, which is designed to ascertain the parameters as a function of at least one statistical distribution.

German Patent Application No. DE 10 2018 216 471.1 describes a quantized neural network.

It is possible to create quantized neural networks having extremely heavy quantization, as shown, for example, by Hubara et al. "Quantized neural networks: Training neural networks with low precision weights and activations," *The Journal of Machine Learning Research*, 2017, vol. 18., no. 1, pp. 6869-6898.

Recurrent neural networks (RNN) have the advantage that these are also able to process pieces of information which are included in a temporal dimension of sensor data. However, the disadvantage of RNNs is that these are not heavily quantizable.

It is desirable, however, to quantize parameters of the RNNs in order to operate RNNs with higher performance on a mobile processing unit.

SUMMARY

According to an example embodiment of the present invention, neural networks having temporal convolutions are used, instead of the RNNs. This has the advantage that, despite a computationally intensive convolution, these neural networks may, surprisingly, consume less energy than comparable RNNs, while maintaining the above-described advantage of RNNs, if their parameters are quantized.

In a first aspect of the present invention, a particularly memory- and energy-efficient example machine learning system for processing time series is provided.

The example machine learning system, in particular, a neural network, in accordance with the present invention, includes at least one filter, at least filter coefficients of the filter being quantized. It is also possible that, in addition to the filter coefficients, further parameters of the machine learning system are quantized. As an alternative or in addition, at least activations may be quantized. The quantization of the activations may be useful when a number of the activations exceeds a number of the parameters (e.g., weights) of the machine learning system.

The machine learning system is configured to ascertain an output variable as a function of an input variable, using the filter. The input variable encompasses a chronological sequence of images. As an alternative, a multitude of temporally consecutively detected variables, such as one-dimensional sensor data, may be used. The machine learning system is furthermore configured to apply the filter to a sequence of pixels, which are all situated at identical coordinates of the images, or at identical coordinates of intermediate results of the machine learning system, in particular, intermediately processed images. In the event that detected variables are used instead of the images, the filter is applied to data points of the detected variables or intermediate results, which are each situated at the same position. The intermediate results are, for example, activations of layers of the neural network.

It is also possible that the filter coefficients, and preferably the further parameters of the machine learning system, each have a value from a predefinable quantized value range. The predefinable quantized value range may be defined by a predefined number of quantization levels and/or by a predefinable number of bits.

Quantized may be understood to mean that the filter coefficients are only able to assume quantized values in the decimal notation, preferably quantized values in a floating, fixed point or integer number format. The filter coefficients are preferably quantized with no more than 32 bits, in particular, with no more than 16 or 8 bits, and preferably with 4 bits or 1 bit. Quantized may furthermore be understood to mean that the filter coefficients were rounded up or down to a nearest quantization level of a multitude of predefinable quantization levels. The filter coefficients then each have a value of the multitude of quantization levels, these values being stored in a memory. The advantage of this is that the quantization levels may be stored in a memory-efficient manner. The number of the quantization levels is dependent on the number of bits used for quantization. As an alternative, a trained machine learning system may be quantized, in which its parameters were adapted at full resolution during training, and were thereupon quantized.

The predefinable quantized value range may also be a list. It is possible that the filter coefficients have a reduced resolution, the resolution having been reduced with the aid of a quantization.

The resolution may characterize, with the aid of how many different possible, in particular, quantized, values the parameters and/or the intermediate results represented in each case.

Applying the filter may be understood to mean that the filter is mathematically convoluted using the data points or the sections which all have the same coordinates.

The example machine learning system according to the first aspect of the present invention has the advantage that, as a result of the quantization, fewer bits are required for storing the filter coefficients, and consequently less memory space is required. In this way, smaller memories may be used, which allow a more compact design of the machine learning system in hardware. Since the energy consumption for storing and reading the parameters and activations is proportional to the number of the bits and, for multiplications, is at least quadratic to the resolution (number of bits) of the parameters and activations, a reduction in the number of the bits, in particular, by a quantization, is particularly computer resource-efficient. Even if the machine learning system is implemented in software, these advantages play a role since less memory is required.

Since, in addition to high-resolution input variables, such as images, the filters have the greatest influence on the energy consumption, a quantization of the filters is advantageous. The reason is that the resulting computer resource-conserving handling is usable both for stationary (e.g., in computer centers) and for mobile applications (e.g., mobile data processing systems or embedded systems). Machine learning systems thus quantized are particularly suitable for processing measured data close to the sensor or in the sensor itself, whereby measured data may be compressed and transmitted in a more broadband-efficient manner.

The images may be LIDAR, radar, ultrasonic or camera images.

It is provided that the input variable is a tensor, which encompasses the multitude of detected variables or the sequence of images. The detected variables or the images are situated along a first dimension of the tensor. The filter is then applied at least along the first dimension. The application of the filter along the first dimension, which characterizes the chronological sequence, is therefore referred to as a temporal convolution.

An advantage of the example machine learning system is that pieces of information included along the time axis are also processed by the temporal filtering. As a result, this machine learning system has recurrent properties. However, no recurrent links are required, which typically cannot be heavily quantized. Nevertheless, more efficient processing of the sequence of the input variables is achieved by the quantized filter than by RNN.

In accordance with an example embodiment of the present invention, it is furthermore provided that the filter is multidimensional, and the machine learning system is furthermore configured to apply the filter to a sequence of sections, which are all situated at identical coordinates of the images, or at identical coordinates of the intermediate results.

A section encompasses a multitude of data points or pixels, which are situated at the respective coordinates of the detected variables or images or intermediate results. The sections may be one-/multidimensional, and a number of the dimensions of the filter has to be selected accordingly. It shall be noted that, in this way, multiple pixels or data points, which are all situated along the, in particular, in parallel to the, first dimension, are additionally taken into consideration during the filtering along the first dimension.

For example, the section may be a line or a rectangle. Different orientations of the sections within the images are possible, e.g., vertical or horizontal or diagonal.

It is furthermore provided that the machine learning system is furthermore configured to apply the filter additionally to a sequence of further sections, which are each situated at different coordinates within the images, or which are each situated at different coordinates within the intermediate results.

The advantage is that, with the aid of the additional application of the filter along each of the detected variables, additional pieces of information are incorporated in the output variable. This means that the filter is applied to further dimensions of the tensor. This may be referred to as a temporal and spatial convolution.

In accordance with the present invention, it is furthermore provided that, in addition to the filter coefficients, also intermediate results, in particular, activations, of the machine learning system are quantized.

It is furthermore possible that intermediate results each have a value from the predefinable quantized value range or a further predefinable quantized value range.

It is furthermore provided that the filter coefficients and/or the intermediate results are binary or ternary. This shall be understood to mean that the respective filter coefficients and/or the intermediate results may assume no more than 2 or 3 different values. These different values are advantageously represented with the aid of no more than one bit or two bits. Ideally they are represented by one bit since a binary neural network is then present, which is particularly processing- and memory-efficient.

It is furthermore provided that the filter omits individual data points during filtering, in particular, along the temporal dimension. This has the advantage that a larger field of vision of the filter is achieved with the aid of fewer filter coefficients, and it is thus possible to look farther into the past.

It is furthermore provided that the machine learning system includes a pooling operation, which is situated directly downstream from the filter.

A pooling operation shall be understood to mean that individual filtered data points or filtered pixels are neglected, in particular, pooled. A local pooling is preferably used, in which data points within a cluster whose values are close to zero are neglected. As an alternative, an average pooling may be used.

It is furthermore provided that the images or detected variables are situated successively according to a predefinable order, in particular, as a function of the respective detected point in time of the image or of the detected variable. The arrangement preferably takes place in an ascending or descending manner according to a point in time of the detection.

It shall be noted that the machine learning system may be implemented both exclusively in hardware, as well as in software, or in a mixture of software and hardware, whereby in each case less memory has to be provided for storing the parameters, which is why the machine learning system according to the first aspect of the present invention may also be installed and used in very small technical systems.

In a second aspect of the present invention, a, in particular, computer-implemented, example method for operating the machine learning system of the first aspect of the present invention is provided. The example method includes the following steps:

grouping the multitude of detected variables into the input variable of the machine learning system; followed by ascertaining the output variable as a function of the input variable, using the filter. The filter of the machine learning system is used in the process, and, in particular, a temporal filtering of the input variable or of the intermediate result is carried out.

For the second aspect of the present invention, it is provided that the images are successively detected in each case at a directly subsequent point in time. When the output variable has been ascertained, a new, detected image is then added to the input variable, and one of the contained images, in particular, the image contained the longest in terms of time, is removed from the input variable.

The images of the input variable are preferably shifted by a position along the first dimension of the tensor, the new, detected image being added at the site which was freed up, and the oldest, detected image of the input variable being removed from the tensor.

It is furthermore provided that the variables, in particular, images, are each assigned to a point in time of a sequence of points in time at which the particular variable was detected, a new variable being detected at each point in time, and the new, detected variable being added to the input variable, in addition to the variable detected at the directly preceding point in time, and the detected variable assigned to the point in time furthest in the past being removed from the input variable.

In one further aspect of the present invention, a method for training the machine learning system of the first aspect is provided. In one example embodiment, the training includes at least the steps of providing training data. The training data encompass at least one multitude of image sequences or time series of detected variables. Thereafter, an ascertainment of at least one output variable for each of the image sequences or time series follows. Thereafter, an ascertainment of a cost function, as a function of the ascertained output variables and the training data, follows. Afterwards, an adaptation of parameters of the machine learning system as a function of the cost function follows, so that the cost function becomes optimal with respect to a predefinable criterion. Thereafter, a quantization of the parameters, in particular, of the filter coefficients, follows.

The quantization is preferably used from the start, and the machine learning system is trained taking it into consideration.

In one further aspect of the present invention, the machine learning system of the first aspect, or the one which was created according to the second aspect, may ascertain, as a function of detected sensor variables, in particular, the images of a sensor, an output variable, which is used thereafter for ascertaining a control variable with the aid of a control unit.

The control variable may be used to control an actuator of a technical system. The technical system may, for example, be an at least semi-autonomous machine, an at least semi-autonomous vehicle, a robot, a tool, a machine tool or a flying object, such as a drone. The input variable may be ascertained as a function of detected sensor data, for example, and be provided to the machine learning system. The sensor data may be detected by a sensor, such as a camera, of the technical system or, as an alternative, be received from the outside.

In one further aspect, a computer program is provided. The computer program is configured to carry out one of the aforementioned methods of the second aspect of the present invention. The computer program includes instructions which prompt a computer to carry out one of these described methods, including all its steps, when the computer program runs on the computer. Furthermore, a machine-readable memory module is provided, on which the computer program is stored.

Exemplary embodiments of the above-described aspects are shown in the figures and are described in greater detail below.

DETAILED DESCRIPTION OF EXAMPLE EMBODIMENTS

Figure 1:
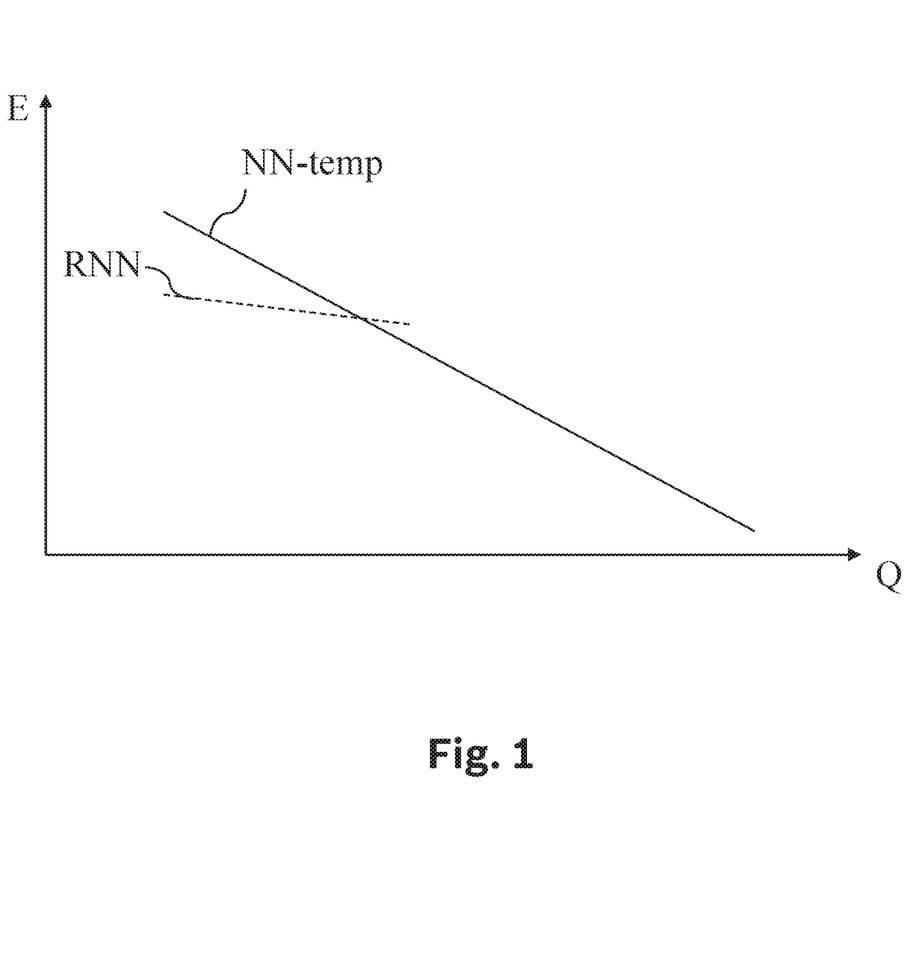
FIG. 1 shows a schematic representation of an energy consumption plotted against a quantization resolution by way of example for two different neural networks, each for processing time series.

FIG. 1 shows a schematic representation of a diagram in which a measured energy consumption E of a neural network having temporal filtering (NN-temp) and a measured energy consumption E of an RNN are plotted against a quantization resolution Q. Care was taken that the two networks achieve similar results on the same data sets. The y axis indicates energy consumption E, which is the lowest at the origin of the diagram and increases with increasing distance from the origin. Quantization resolution Q, which increases in the direction of the origin of the diagram, is plotted on the x axis. This means that, the closer to the origin, the higher is the quantization resolution, in particular, the number of bits representing the parameters. Hereafter, we consider the exemplary case that the neural network having the temporal filtering (NN-temp) has a considerably greater energy consumption for a high quantization resolution than a comparable RNN does at the same quantization resolution.

When the resolution of the parameters of the two neural networks is reduced, the respective energy consumption of the two neural networks decreases. When comparing the minimum quantization resolution of the neural network having temporal filtering (NN-temp) to the minimum quantization resolution of the RNN, it is noticeable that the minimum quantization resolution of the neural network having temporal filtering (NN-temp) is considerably lower than the minimum quantization resolution of the RNN, on the condition that the quality of the results of the two neural networks essentially remains unchanged. As a result, the neural network having temporal filtering (NN-temp) consumes less energy than the RNN, due to the heavy quantization.

Figure 2:
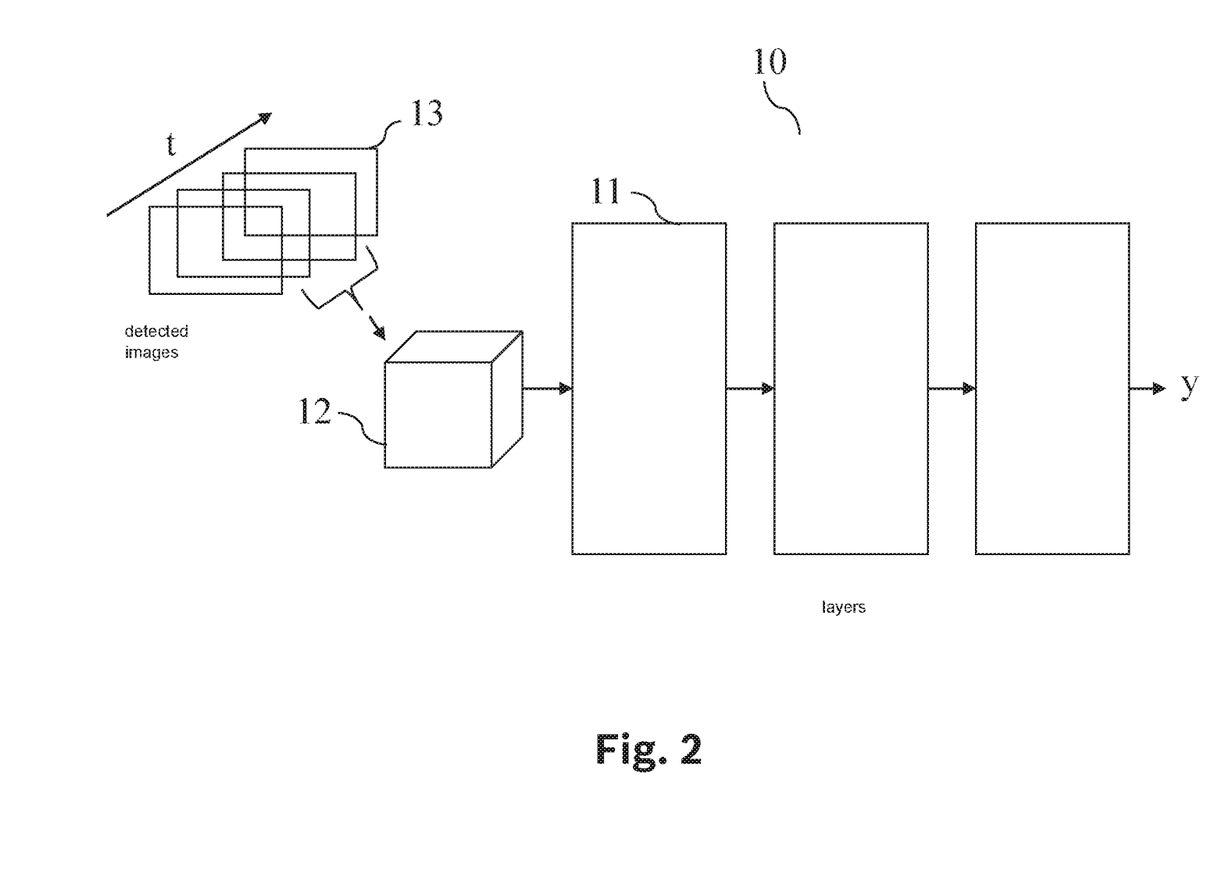
FIG. 2 shows a schematic representation of a deep neural network, including a filter for a temporal convolution.

FIG. 2 shows a schematic representation of a machine learning system 10, in particular, of a deep neural network. Machine learning system 10 includes a multitude of layers 11, which are connected to one another in a predefinable order. Machine learning system 10 ascertains an output variable y as a function of an input variable 12.

Machine learning system 10 may output a classification, a segmentation of one of the images or of one of the most recently detected images, of input variable 12 as output variable y. As an alternative, output variable y may be a regression.

Input variable 12 is a tensor in this exemplary embodiment. The tensor encompasses a multitude of successively detected images 13. The images are situated along a first dimension of the tensor.

The layers may be fully connected layers, at least one of the layers being configured to carry out a temporal filtering. The temporal filtering is used during the propagation of input variable 12 by the machine learning system. The temporal filtering is explained in greater detail in the following FIG. 3.

Figure 3:
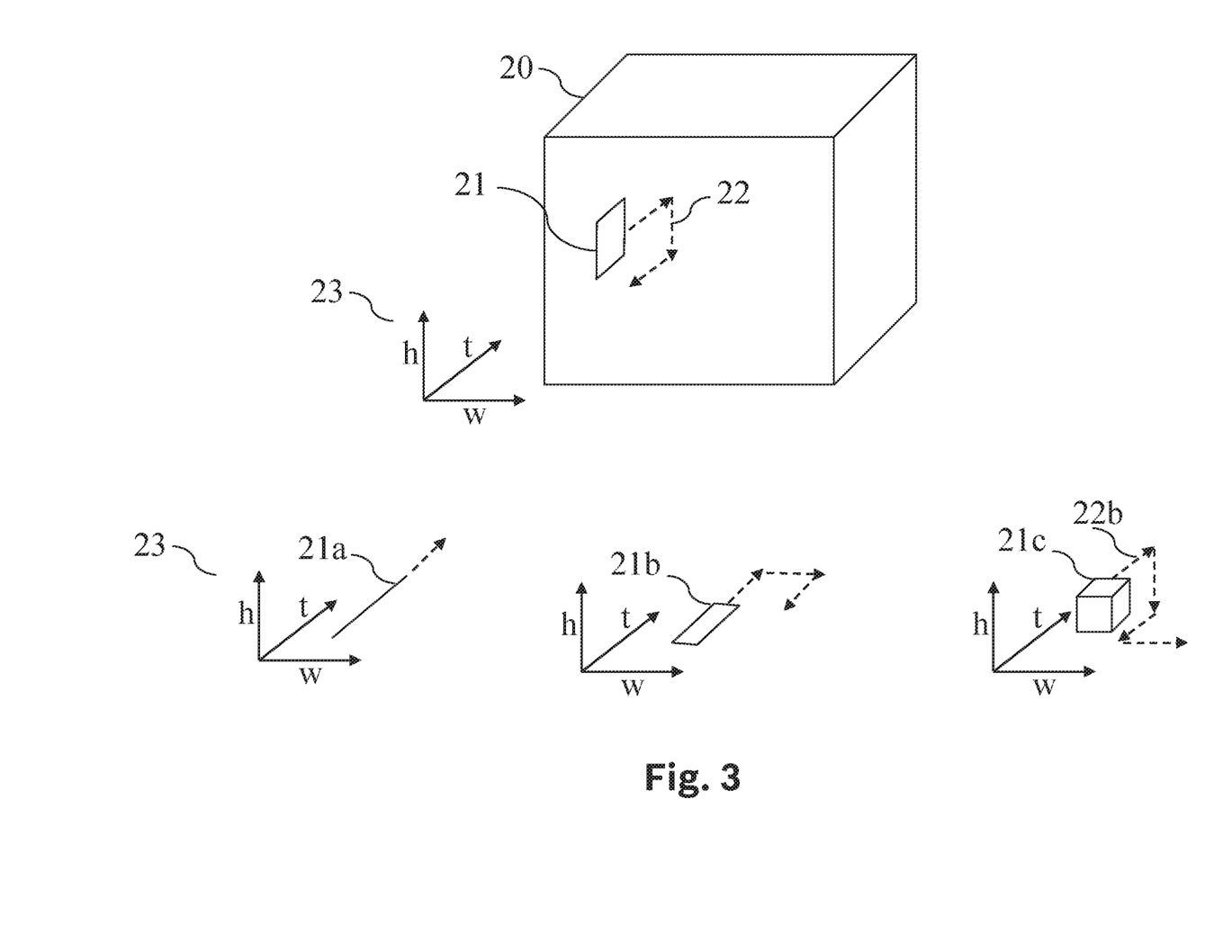
FIG. 3 shows a schematic representation of the temporal convolution.

FIG. 3 shows a schematic representation of the temporal convolution, in other words, of the temporal filtering.

The illustrated tensor 20 in FIG. 3 may be either input variable 12 or an intermediate variable of machine learning system 10. The intermediate variable is an output variable of one of layers 11, for example.

A coordinate system 23 is shown schematically on the left, beneath tensor 20. Coordinate system 23 includes three dimensions h, t, w by way of example, along which tensor 20 extends. It shall be noted that images 13 along "time" dimension t are successively situated in tensor 20. Dimensions h and w are spatial dimensions by way of example, in which images 13 extend.

Tensor 20 is now temporally filtered with the aid of filter 21. This takes place in that the filter carries out a filtering along "time" dimension t along tensor 20. An exemplary progression of the temporal convolution, in particular, of the temporal convolution of filter 21 with tensor 20, is shown schematically based on dotted arrows 22.

As an alternative, the temporal filtering may be carried out using one of the further filters 21*a*, 21*b*, 21*c*. The further filters differ from one another in that they have different numbers of dimensions. For example, further filter 21*c* is a three-dimensional filter. A possible progression of the convolution of three-dimensional filter 21*c* with tensor 20 is shown by way of example by dotted arrows 22*b*, next to three-dimensional filter 21*c*. It shall be noted that a filtering of three-dimensional filter 21*c* with tensor 20 represents both a temporal and a spatial filtering, when the convolution is carried out in accordance with dotted arrows 22*b*.

Figure 4:
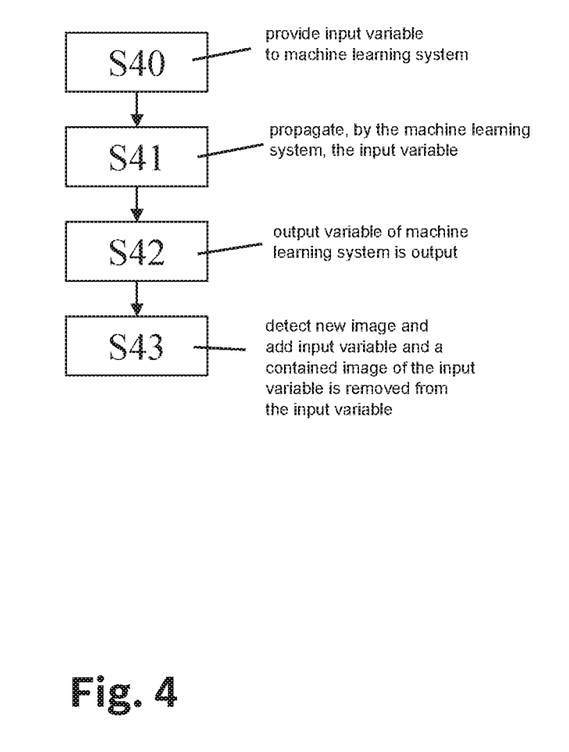
FIG. 4 shows a schematic representation of a flow chart of a method for operating the neural network, including the filter for the temporal convolution.

FIG. 4 shows a schematic flow chart of a method for operating machine learning system 10.

In a first specific embodiment, the method starts with step S40. In this step, input variable 12 is provided to machine learning system 10.

In subsequent step S41, the provided input variable 12 is propagated by machine learning system 10. During the propagation, either input variable 12 or an intermediate variable of machine learning system 10 is temporally filtered with the aid of filter 21, see explanations regarding FIG. 3. The filter has quantized filter coefficients. Preferably, all further parameters of machine learning system 10 are also quantized.

In subsequent step S42, the output variable of the machine learning system is output.

Thereupon, in subsequent step S43, a new image is detected and added to input variable 12, and a contained image of input variable 12 is removed from input variable 12.

Thereupon, the method is carried out repeatedly with all its steps S40 through S43.

In one further specific embodiment of the method for operating machine learning system 10, steps S40 through S43 are used for training machine learning system 10. During training, the parameters of the machine learning system are additionally optimized after step S43, as a function of a cost function (loss function). The cost function characterizes a deviation between the ascertained output variables of machine learning system 10 and the associated training output variables of the respectively used input variables. Already quantized parameters may be used during the ascertainment of the output variables. The optimization of the cost function with the aid of the parameters of the machine learning system may be carried out, for example, with the aid of a gradient descent method, such as, for example, "backpropagation-(through time)." The gradient descent method is used in the process to minimize or to maximize the cost function, as a function of the parameters. After the parameters have been optimized, the parameters, in particular, the filter coefficients, are quantized. A resolution of the parameters of at least 32 bits is advantageously used for optimizing the parameters. The resolution is then reduced during the quantization, for example to 8 bits or even to 1 bit.

In one refinement of the first specific embodiment of the example method for operating machine learning system 10, the output variable of machine learning system 10 may optionally be used after completing step S43, to activate an at least semi-autonomous robot as a function of this output variable. The at least semi-autonomous robot is shown by way of example in the following FIG. 5.

Figure 5:
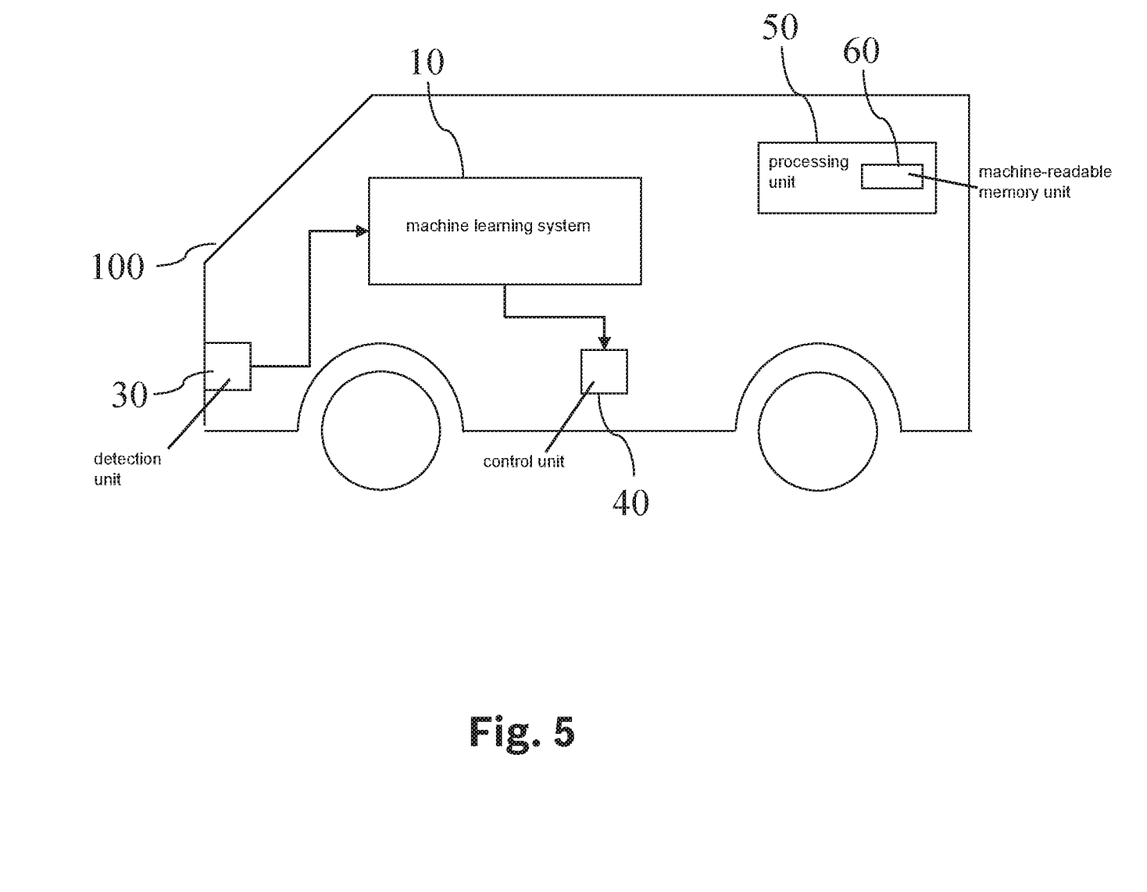
FIG. 5 shows a schematic representation of a use of the neural network, including the filter for the temporal convolution, for a robot.

FIG. 5 shows a schematic representation of the at least semi-autonomous robot, which in a first exemplary embodiment is an at least semi-autonomous vehicle 100. In one further exemplary embodiment, the at least semi-autonomous robot may be a service, assembly or stationary manufacturing robot, or, as an alternative, an autonomous flying object, such as a drone.

The at least semi-autonomous vehicle (100) may include a detection unit 30. Detection unit 30 may be a camera, for example, which detects surroundings of vehicle 100. Detection unit 30 may be connected to a machine learning system 10. Machine learning system 10 ascertains an output variable, as a function of a provided input variable, e.g., provided by detection unit 30, and as a function of a multitude of parameters of machine learning system 10. The output variable may be forwarded to a control unit 40.

Control unit 40 controls an actuator as a function of the output variable of machine learning system 10, and preferably controls the actuator in such a way that vehicle 100 carries out a collision-free maneuver. In the first exemplary embodiment, the actuator may be an engine or a braking system of vehicle 100.

In one further exemplary embodiment, the semi-autonomous robot may be a tool, a machine tool or a production robot. A material of a workpiece may be classified with the aid of machine learning system 10. The actuator may be, for example, a motor, which operates a grinding head.

Vehicle 100, in particular, the semi-autonomous robot, furthermore includes a processing unit 50 and a machine-readable memory element 60. A computer program may be stored on memory element 60, which includes commands which, during execution of the commands on processing unit 50, cause machine learning system 10 to be operated with the aid of processing unit 50.

What is claimed is:

1. A machine learning system including at least one filter having quantized filter coefficients, the machine learning system being configured to ascertain an output variable as a function of an input variable, using the filter, the input variable including a chronological sequence of images, the machine learning system being configured to apply the filter, along a time axis, to a chronological sequence of pixels, which are all situated at identical coordinates of the images or at identical coordinates of intermediate results of the machine learning system, wherein the filter is a temporal filter.

2. The machine learning system as recited in claim 1, wherein the machine learning system is a deep neural network including a convolutional layer.

3. The machine learning system as recited in claim 1, wherein the machine learning system is implemented in hardware or a combination of hardware and software.

4. The machine learning system as recited in claim 3, wherein the machine learning system is installed in a vehicle, the vehicle including a control unit, wherein the control unit is configured to control an actuator of the vehicle using the ascertained output variable from the machine learning system.

5. The machine learning system as recited in claim 1, wherein the filter is multidimensional, and the machine learning system is configured to use the filter on a sequence of sections, which are all situated at identical coordinates of the images, or at identical coordinates of the intermediate results.

6. The machine learning system as recited in claim 5, wherein the machine learning system is configured to additionally use the filter on a sequence of further sections, which are each situated at different coordinates within the images, or which are each situated at different coordinates within the intermediate results.

7. The machine learning system as recited in claim 1, wherein, in addition to the filter coefficients, the intermediate results are quantized.

8. The machine learning system as recited in claim 7, wherein the filter coefficients and/or the intermediate results are binary or ternary.

9. The machine learning system as recited in claim 1, wherein the filter is configured to omit individual pixels of the images or of the intermediate results during the use of the filter.

10. The machine learning system as recited in claim 1, wherein the machine learning system includes a pooling operation, which is situated directly downstream from the filter.

11. The machine learning system as recited in claim 1, wherein the images are successively situated according to a predefined order, the filter being applied to a sequence of the pixels or sections, which are all situated at identical coordinates, and the pixels or sections of the sequence being situated according to the order.

12. A method for operating a machine learning system, comprising the following steps:
providing a machine learning system including at least one filter having quantized filter coefficients, the machine learning system being configured to ascertain an output variable as a function of an input variable, using the filter, the input variable including a chronological sequence of images, the machine learning system being configured to apply the filter, along a time axis, to a chronological sequence of pixels, which are all situated at identical coordinates of the images or at identical coordinates of intermediate results of the machine learning system, wherein the filter is a temporal filter;
grouping the sequence of the images into the input variable of the machine learning system; and
ascertaining, by the machine learning system, the output variable as a function of the input variable, using the filter along the time axis.

13. The method as recited in claim 12, further comprising:
controlling an actuator of a vehicle using the ascertained output variable.

14. The method as recited in claim 12, wherein the images are each successively detected at a directly subsequent point in time, and wherein when the output variable has been ascertained, a newly detected image is then added to the input variable, and an image that is contained in the input variable the longest in terms of time is removed from the input variable, and wherein the machine learning system ascertains a further output variable as a function of the input variable using the filter.

15. A method for training machine learning system, the machine learning system including at least one filter having quantized filter coefficients, the machine learning system being configured to ascertain an output variable as a function of an input variable, using the filter, the input variable including a chronological sequence of images, the machine learning system being configured to apply the filter, along a time axis, to a chronological sequence of pixels, which are all situated at identical coordinates of the images or at identical coordinates of intermediate results of the machine learning system, the method comprising the following steps:
providing training data which include at least a multitude of the sequences of images and assigned training output variables;
ascertaining at least one output variable for each of the sequences of the images;
ascertaining a cost function, as a function of the ascertained output variables and the training output variables;
adapting parameters of the machine learning system including the filter coefficients of the filter, as a function of the cost function, so that the cost function becomes optimal with respect to a predefinable criterion; and
after the adapting, quantizing the filter coefficients of the filter of the machine learning system, wherein the filter is a temporal filter.

16. A non-transitory machine-readable memory element on which is stored a computer program for operating a machine learning system, the computer program, when executed by a computer, causing the computer to perform the following steps:
providing a machine learning system including at least one filter having quantized filter coefficients, the machine learning system being configured to ascertain an output variable as a function of an input variable, using the filter, the input variable including a chronological sequence of images, the machine learning system being configured to apply the filter, along a time axis, to a chronological sequence of pixels, which are all situated at identical coordinates of the images or at identical coordinates of intermediate results of the machine learning system;
grouping the sequence of the images into the input variable of the machine learning system; and
ascertaining, by the machine learning system, the output variable as a function of the input variable, using the filter along the time axis, wherein the filter is a temporal filter.

* * * * *